US008430658B2

(12) United States Patent
Zorovich et al.

(10) Patent No.: US 8,430,658 B2
(45) Date of Patent: *Apr. 30, 2013

(54) METHOD AND APPARATUS FOR MAKING FROZEN COMESTIBLES

(75) Inventors: Kenneth Daniel Zorovich, Hoboken, NJ (US); Yos Kumthampinu, Edgewater, NJ (US); John Chandler Earle, Annapolis, MD (US); Jesse Pierce Delgigante, Jersey City, NJ (US)

(73) Assignee: Propeller, Inc., Hoboken, NJ (US)

( * ) Notice: Subject to any disclaimer, the term of this patent is extended or adjusted under 35 U.S.C. 154(b) by 529 days.

This patent is subject to a terminal disclaimer.

(21) Appl. No.: 12/321,237

(22) Filed: Jan. 16, 2009

(65) Prior Publication Data

US 2010/0183789 A1 Jul. 22, 2010

(51) Int. Cl.
*A23G 9/26* (2006.01)
*F28F 1/10* (2006.01)

(52) U.S. Cl.
USPC ........ 425/117; 425/318; 425/378.1; 425/458; 425/468; 249/58; 249/81; 249/111; 249/114.1; 249/120; 249/122; 249/127; 62/352; 62/356; 62/457.2; 62/457.9; 62/529

(58) Field of Classification Search ............ 249/58, 249/63, 64, 67–71, 79–81, 92–94, 111, 114.1, 249/115, 122, 127, 133–135, 149, 177, 119–121, 249/124, 183; 425/318, 378.1, 384, 414, 425/422, 438, 458, 117, 126.2, 440, 436 RM, 425/468; 62/345, 346, 350–352, 356, 451, 62/457.2, 523, 526, 529; 220/592.14, 592.15; 426/279, 282, 524

See application file for complete search history.

(56) References Cited

U.S. PATENT DOCUMENTS

| 1,505,592 | A | | 8/1924 | Epperson |
| 1,698,332 | A | * | 1/1929 | Henning et al. ............... 62/4 |
| 1,987,945 | A | | 1/1935 | Schnaier |

(Continued)

FOREIGN PATENT DOCUMENTS

| CN | 2207553 Y | 9/1995 |
| CN | 1542389 A | 11/2004 |

(Continued)

OTHER PUBLICATIONS

Production, properties and uses of Polyethylene, published from Aus-e-tute, pp. 1-3, published date is unknown.*

(Continued)

*Primary Examiner* — Dimple Bodawala
(74) *Attorney, Agent, or Firm* — Greenberg Traurig, LLP (57) ABSTRACT

A frozen comestible maker suitable for home use includes single or multiple molding cavities for forming frozen comestibles, a heat exchanger for maximizing the heat transfer away from the fluid that is being frozen in the molding cavities, a refrigerant solution with a depressed freezing point in contact with the heat exchangers, a base container to seal the refrigerant solution from the fluid that is being frozen, and a bezel piece to retain spills and aid with handling. The refrigerant solution is captured between the molding cavities and the base container. One or more sticks, a drip cup, and an extraction tool may be provided with the frozen comestible maker for preparing and extracting shaped frozen comestibles, such as ice pops and popsicles, therefrom.

38 Claims, 11 Drawing Sheets

U.S. PATENT DOCUMENTS

| | | | |
|---|---|---|---|
| 2,282,544 A * | 5/1942 | Rosberg | 62/66 |
| 2,238,044 A | 6/1942 | Stemme | |
| 2,285,149 A * | 6/1942 | Arcey | 62/73 |
| 2,288,004 A * | 6/1942 | Lauderdale | 82/161 |
| 2,317,067 A | 4/1943 | Knaust | |
| 2,460,765 A * | 2/1949 | Palaith | 62/294 |
| 2,498,645 A * | 2/1950 | Bobby | 62/75 |
| 2,541,814 A | 2/1951 | Gaddini | |
| 2,591,261 A | 4/1952 | Holahan | |
| 2,775,099 A * | 12/1956 | Brown | 62/351 |
| 2,782,608 A * | 2/1957 | French et al. | 62/352 |
| D185,302 S | 5/1959 | Mitzenmacher | |
| 2,946,207 A | 7/1960 | Hulterstrum | |
| D192,225 S | 2/1962 | Coleman | |
| 3,020,730 A * | 2/1962 | Harris, Sr | 62/307 |
| 3,091,194 A | 5/1963 | Dickinson | |
| 3,161,031 A * | 12/1964 | Flannery | 62/457.4 |
| 3,261,178 A | 7/1966 | Okada | |
| 3,306,512 A | 2/1967 | Pagnini | |
| D211,043 S | 5/1968 | Kay | |
| 3,483,712 A | 12/1969 | Gram | |
| 3,533,246 A * | 10/1970 | Hawley | 62/345 |
| 3,535,889 A | 10/1970 | Curti | |
| 3,695,895 A * | 10/1972 | Brown | 426/389 |
| 3,770,460 A | 11/1973 | Vroman | |
| 3,780,536 A | 12/1973 | Fishman et al. | |
| 4,104,411 A | 8/1978 | Pooler | |
| 4,226,355 A | 10/1980 | Helfrich | |
| 4,239,175 A | 12/1980 | Straubinger | |
| 4,330,245 A * | 5/1982 | Billett et al. | 425/126.2 |
| 4,352,830 A | 10/1982 | Billett et al. | |
| 4,392,603 A | 7/1983 | Cross et al. | |
| 4,392,803 A | 7/1983 | Cross et al. | |
| 4,550,575 A | 11/1985 | DeGaynor | |
| 4,557,117 A * | 12/1985 | Furia et al. | 62/340 |
| 4,638,645 A * | 1/1987 | Simila | 62/457.1 |
| 4,688,398 A | 8/1987 | Baek | |
| 4,696,166 A | 9/1987 | Bukoschek et al. | |
| 4,761,128 A * | 8/1988 | Fowler et al. | 425/126.2 |
| 4,797,295 A * | 1/1989 | Franco et al. | 426/421 |
| 4,815,287 A * | 3/1989 | O'Daniel | 62/430 |
| 4,986,080 A * | 1/1991 | Grigoli et al. | 62/75 |
| 5,177,981 A | 1/1993 | Haas | |
| 5,354,191 A * | 10/1994 | Bobis | 425/118 |
| D353,251 S | 12/1994 | Beck | |
| 5,403,051 A | 4/1995 | Watkins | |
| 5,516,540 A * | 5/1996 | Cathenaut | 426/249 |
| 5,568,729 A * | 10/1996 | Heinrich et al. | 62/75 |
| 5,720,175 A * | 2/1998 | White et al. | 62/76 |
| 6,109,056 A | 8/2000 | Feldpausch | |
| 6,190,226 B1 | 2/2001 | Conconi | |
| RE37,213 E | 6/2001 | Staggs | |
| 6,301,919 B1 | 10/2001 | Blaustein et al. | |
| 6,370,904 B2 | 4/2002 | Tchougounov et al. | |
| 6,399,126 B1 * | 6/2002 | Weldon, Jr. | 426/134 |
| 6,425,438 B1 * | 7/2002 | Hahn | 165/47 |
| 6,453,682 B1 * | 9/2002 | Jennings et al. | 62/56 |
| 6,481,239 B2 * | 11/2002 | Hodosh et al. | 62/457.4 |
| 6,540,200 B2 * | 4/2003 | Afolabi | 249/66.1 |
| 6,565,100 B1 * | 5/2003 | Marshall et al. | 279/36 |
| 6,631,616 B2 * | 10/2003 | Wisniewski et al. | 62/66 |
| 6,745,595 B1 | 6/2004 | Kateman et al. | |
| D498,719 S * | 11/2004 | Yao | D12/179 |
| D540,006 S | 4/2007 | Green et al. | |
| 7,520,140 B2 | 4/2009 | DeLucia | |
| D592,911 S | 5/2009 | Buchanan | |
| D594,626 S * | 6/2009 | Reed | D1/105 |
| 7,955,066 B2 * | 6/2011 | Takeuchi | 425/117 |
| 2003/0014854 A1 * | 1/2003 | Brown | 29/426.5 |
| 2003/0126712 A1 * | 7/2003 | Kosick | 15/248.2 |
| 2004/0216865 A1 | 11/2004 | Lee et al. | |
| 2005/0072321 A1 | 4/2005 | Larsen | |
| 2005/0202138 A1 * | 9/2005 | Kazich | 426/421 |
| 2006/0134296 A1 | 6/2006 | Lin | |
| 2007/0275126 A1 | 11/2007 | Chan | |
| 2008/0020120 A1 | 1/2008 | O'Donnell Kiely | |
| 2008/0241334 A1 | 10/2008 | Liberman | |
| 2009/0178430 A1 | 7/2009 | Jendrusch et al. | |

FOREIGN PATENT DOCUMENTS

| | | |
|---|---|---|
| EP | 0417413 B1 | 5/1994 |
| GB | 402325 | 11/1933 |
| GB | 666297 | 2/1952 |
| JP | 57155953 A | 9/1982 |
| WO | WO 8704781 A1 * | 8/1987 |
| WO | 2006123319 A1 | 11/2006 |
| WO | 2010083045 A1 | 1/2010 |

OTHER PUBLICATIONS

Introduction to mechanism; Zhang et al., pp. 1-12. date is not available.*

Properties of polyethylene from Aus-e-tute, pp. 1-3, date is not applicable.*

International Search Report and Written Opinion, issued on Mar. 24, 2010 in connection with International Patent Application No. PCT/US2010/000098.

U.S. Appl. No. 29/360,963, filed May 4, 2010, entitled "Comestible Maker".

U.S. Appl. No. 29/361,004, filed May 4, 2010, entitled "Drip Cup Attachment".

U.S. Appl. No. 29/361,010, filed May 4, 2010, entitled "Removal Tool".

U.S. Appl. No. 29/361,072, filed May 5, 2010 entitled "Insert For a Comestible Maker".

U.S. Appl, No. 29/361,137, filed May 6, 2010, entitled "Stick For a Comestible Maker".

* cited by examiner

FIG. 12

METHOD AND APPARATUS FOR MAKING FROZEN COMESTIBLES

TECHNICAL FIELD

This disclosure generally relates to producing consumable products by cooling, and in particular it relates to producing shaped or modified congealed products using a contained refrigerant solution.

BACKGROUND OF THE DISCLOSURE

Though frozen comestibles formed on a stick (such as ice pops, POPSICLES and the like) enjoy wide popularity, they are generally obtainable only through commercial and industrial sources, such as ice cream vendors or grocery stores. There have been few useful convenient devices or processes that have been proposed or introduced for the quick preparation of such food items in the home. While frozen comestibles can be molded and frozen in common refrigerator/freezer units, such methods can take hours for the comestible to form.

There have, by contrast, been many types of modern household ice cream makers introduced. By and large, they use double walled bowls that have heat exchangers and contain liquids with depressed freezing points, such as below 32° Fahrenheit. Ice cream makers typically only freeze liquids directly touching the wall, which is then continuously scraped off and mixed to produce, for example, ice cream or frozen yogurts. Accordingly, such ice cream makers are adapted for those specific comestibles only, and cannot generally be used for making ice pops, POPSICLES and the like.

Accordingly, there is a need for a process and apparatus for conveniently making frozen comestibles on a stick, which overcomes the disadvantages of existing technologies.

SUMMARY OF THE DISCLOSURE

The present disclosure, therefore, introduces methods and devices for making frozen comestibles, which are particularly suited for, but not limited to, making frozen, shaped comestibles on a stick. A suitable device may include a container for holding a refrigerant solution therein. The container has one or more molding cavities for receiving a fluid to be frozen, where the fluid is contained within the molding cavity separately from the refrigerant solution within the container. A molding cavity may include a coating on an inner surface thereof to facilitate removal of a frozen comestible produced from the fluid. A molding cavity may further include one or more heat exchangers on an external surface thereof, which are disposed within the refrigerant solution. When the refrigerant solution is at a sufficiently cool temperature, the fluid is frozen within the molding chamber, assisted by the thermal action of the heat exchanger and the refrigerant solution, to form the frozen comestible within, for example, within ten minutes, and as few as three minutes dependent upon environmental conditions, state of recharging of the comestible maker and the shape of the molding cavities.

In various embodiments, a removable stick may be provided for use with the frozen comestible maker. The stick may having a blade for insertion into the molding chamber and the fluid to be frozen, and may further include a handle that is grasped by a human hand.

In various embodiments, a drip cup may be disposed between the handle and the blade.

In various embodiments, an extraction tool may be provided, which mates with the handle to produce a torque thereon and/or to provide additional linear force for the removal of the comestible. When operated by hand, the extraction tool provides sufficient force to loosen the frozen comestible from the molding cavity, and better enables the removal of the frozen comestible from the molding cavity by hand.

In various embodiments, a method for making a frozen comestible includes chilling the container of the frozen comestible maker in a refrigeration device to a temperature below the freezing point of water for several hours, removing the container from the refrigeration device, dispensing the fluid to be frozen into the molding chambers, inserting a stick into the molding chamber, and within ten minutes or less in various embodiments, applying the extraction tool to the handle of the stick to generate a torque, or otherwise removing the stick from the container, thereby producing a frozen comestible that is ready for consumption.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

The disclosed method devices and methods for making frozen comestibles include a mold or series of molds used for freezing pops and creating specifically shaped comestibles on a stick. Such devices may be used for quickly freezing water for ice cubes or for creating ice pops, ice cream pops, yogurt pops, juice pops, fruit pops, POPSICLES, FUDGESICLES, CREAMSICLES or other comestibles, particularly comestibles disposed on a stick, in a very short period of time. The disclosed devices will freeze its contents solid from the outside in, within typically three to ten minutes. Any appropriate suitable substance that can be poured into such devices is frozen quickly and extracted easily for consumption, thereby constituting an "instant" ice pop maker that is of suitable size for home use. The single or multiple molds or cavities are mated to a container that contains a refrigerating liquid or gel with a depressed freezing point below the freezing point of water, namely 32° Fahrenheit. Within the device and connected to the molds are efficient heat exchanging components in contact with the refrigerating fluid, which pull the heat away from the liquid to be frozen at a high rate of speed once it is poured into the mold, causing the contents to freeze rapidly. The heat exchanger and mold cavity are preferably made of a material with a high rate of thermal conductivity.

Referring now to FIGS. 1-12, wherein similar components of the present disclosure are referenced in like manner, various exemplary embodiments of a method and apparatus for making frozen comestibles are disclosed.

Figure 1:
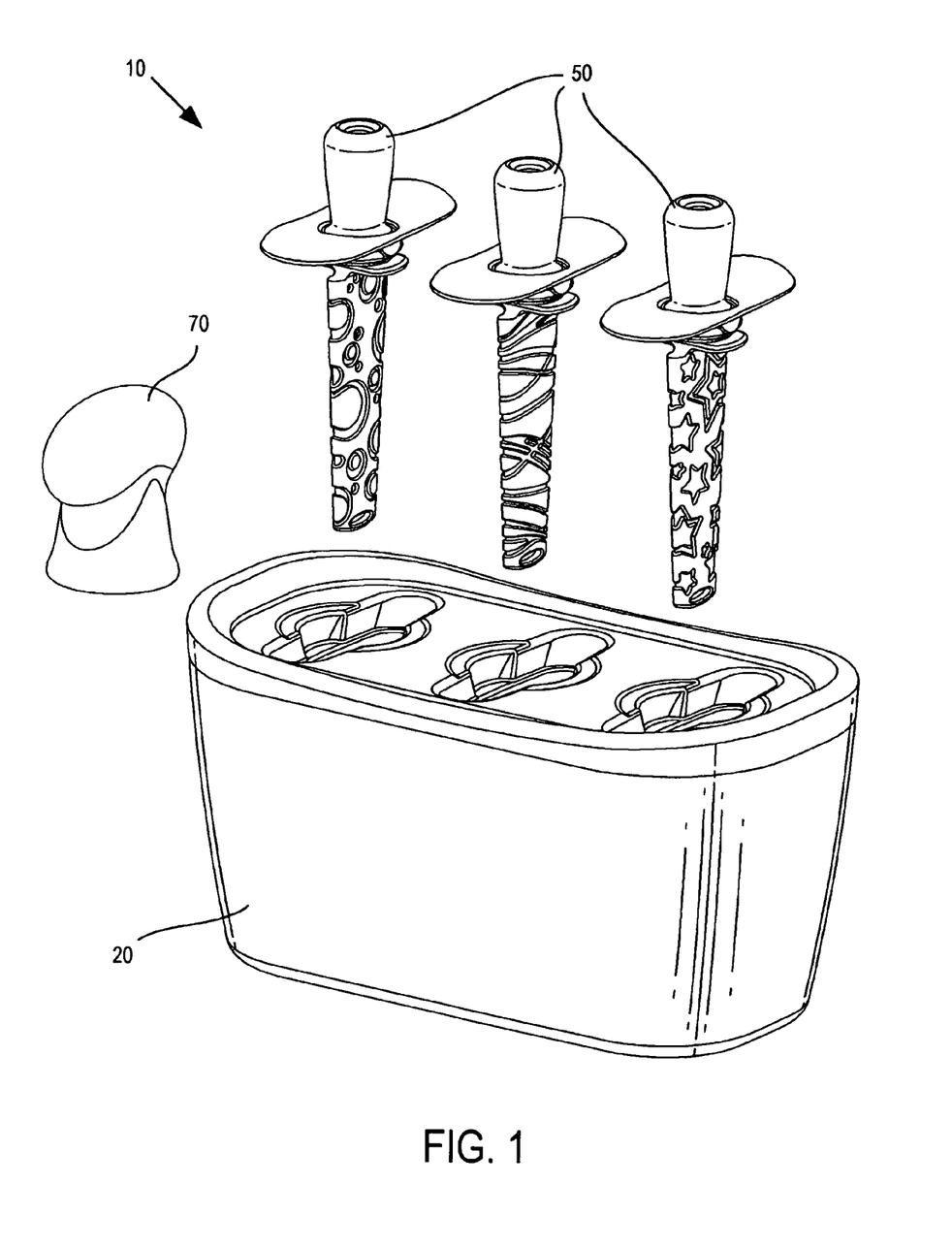
FIG. 1 depicts an exemplary comestible maker and accessories according to the present disclosure.

FIG. 1 depicts an exemplary comestible maker 10 and accessories according to the present disclosure. The comestible maker 10 includes a base container 20, which serves as both a vessel for a refrigerant solution and an outer shell of the frozen comestible maker. It is made of an insulating material, such as a rigid plastic, to protect user's hands from the extreme cold of the refrigerant solution and to prevent heat exchange between ambient air and the refrigerant solution.

The refrigerant solution is any known and suitable type of liquid or gel substance that has a freezing point less than 32° Fahrenheit. A wide variety of suitable refrigerant solutions will be readily apparent to one of ordinary skill in the art, including gels used in well-known freezable ice-packs that are applied to a human body to reduce swelling and the like.

Accessories for use with the comestible maker 10 may include one or more sticks 50 on which the comestible is formed within the molds of the base container 20, and an extraction tool 70 that is applied to a handle portion of the sticks 50, and which is used to help dislodge a frozen comestible from a mold. The sticks 50 and extraction tool 70 are described in more detail herein below.

Figure 2:
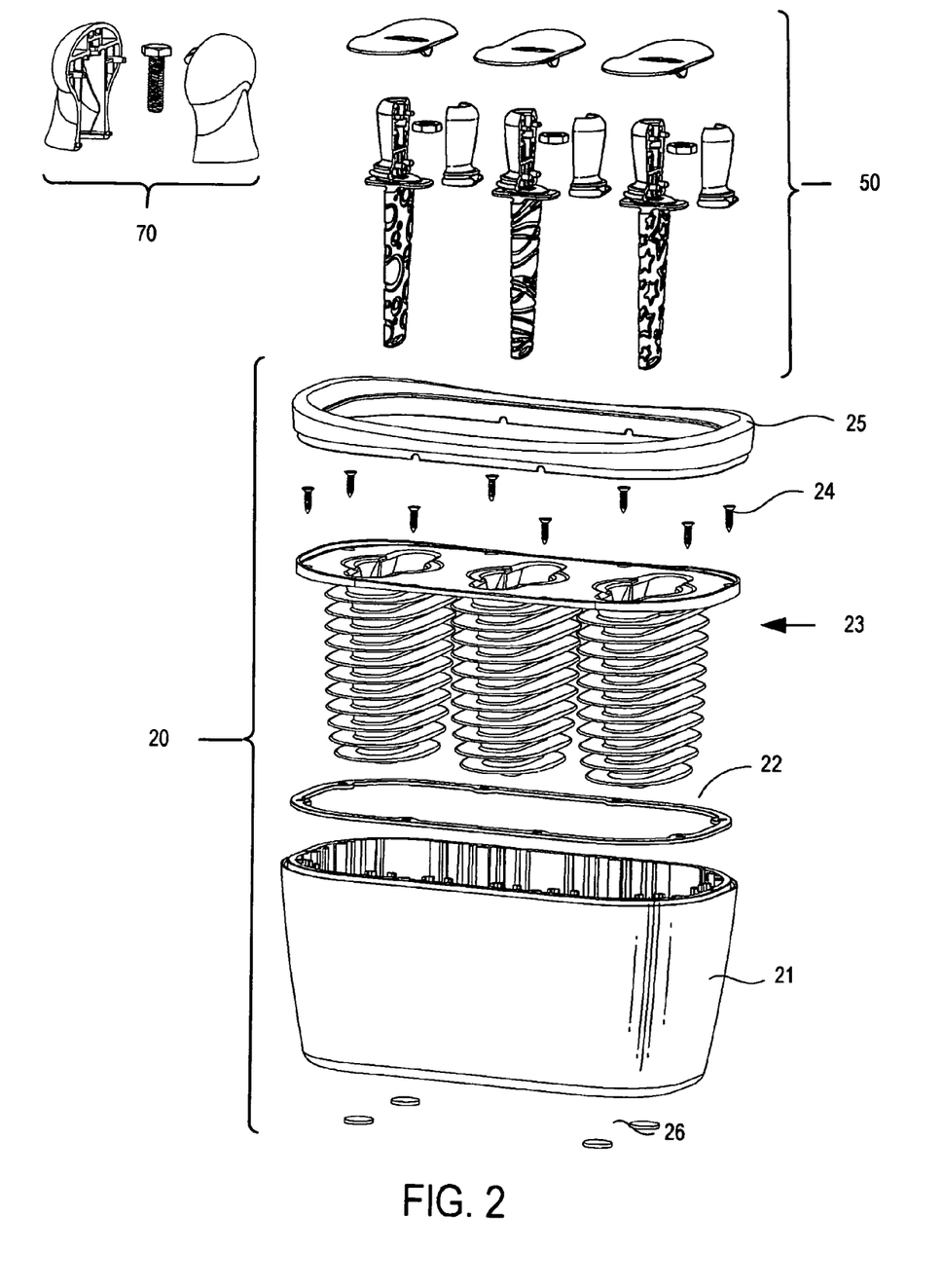
FIG. 2 depicts exemplary components and sub-assemblies of the comestible maker and accessories of FIG. 1.

FIG. 2 depicts exemplary disassembled components and sub-assemblies of the comestible maker 10 of FIG. 1. In particular, the base container 20 may include a refrigerant solution holding bowl 21 that is made of plastic or other durable material that is mated to the molding cavities 23 via screws 24 (or other well-known suitable fasteners), or by a glue or epoxy, or by an ultrasonic weld.

Between the bowl 21 and molding cavities 23, there may be disposed a seal 22 or gasket, such as a silicone gasket, that is used to prevent leakage of the refrigerant solution from the bowl 21.

A bezel 25 may serve to provide the comestible maker 10 more decorative, finished look. In addition, the bezel 25 hides the screws 24 or other fasteners used to mate and seal 22 and the molding cavities 23 to the bowl 21. The bezel 25 also acts as a lip around the molding cavities 23 to contain any liquid that does not end up in the molding cavities 23, and prevents it from spilling over the sides of the frozen comestible maker 10. The bezel 25 also functions to provide an area that is insulated and not thermally-conductive in order to protect a user's hands from the cold surface of the comestible maker 10, while they are handling the frozen comestibles or the comestible maker 10. The bezel 25 may also be used to mate and seal the frozen comestible maker 10 and can be made from any suitable durable material, such as a metal, a silicone or a plastic.

In various embodiments, the comestible maker 10 may include one or more feet 26, which may be made of rubber, plastic or the like to prevent the comestible maker 10 from slipping on a surface upon which it may be placed, such as a kitchen counter.

Figure 3:
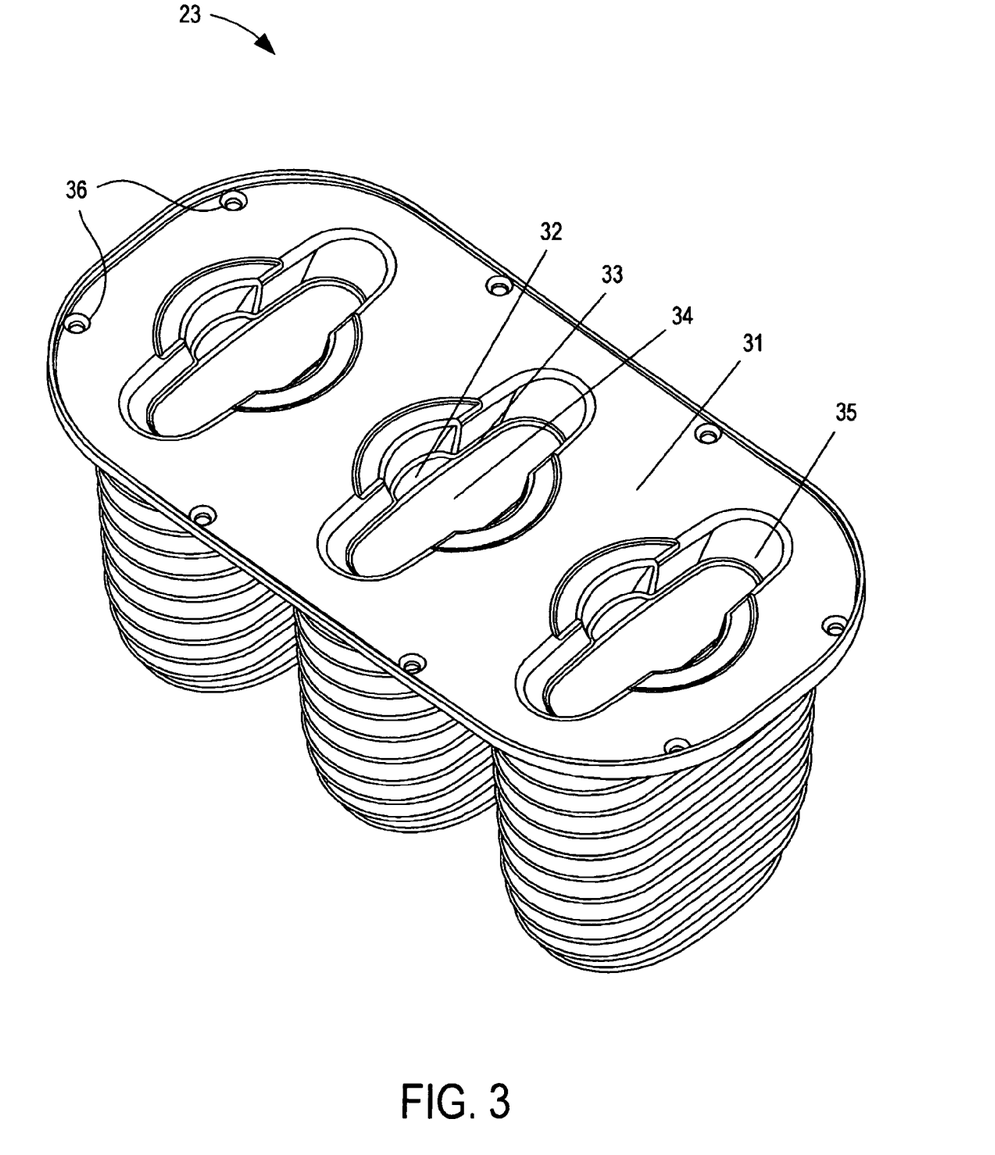
FIG. 3 depicts an exemplary mold cavity of the comestible maker of FIG. 1.

FIG. 3 depicts exemplary molding cavities 23 of the comestible maker 10 of FIG. 1, which are used to mold the frozen comestibles produced thereby. The molding cavities 23 are made from a material with high thermal conductivity, such as a metal (i.e., a cast aluminum alloy or stainless steel), conductive plastics, and the like, and may be die-cast, injection molded, mechanically stamped, hydro-formed, deep-drawn, or produced by any other suitable process that attains the desired geometry. The shape of an individual molding cavity 23 determines the final shape of the frozen comestible. The possible variations in shape are limitless, i.e. star-shaped, circular, elliptical, racetrack or oval, wavy, diamond, etc. The molding cavities 23 preferably have a geometry suitable to facilitate centering and balancing the sticks 50 therein and removal of the frozen comestible therefrom. The top surface 31 of the molding cavities 23 are made, for example, of aluminum.

A notch 32 within a molding cavity 23 may be provided to properly position the stick 50 when it is placed into the molding cavity 23. The stick 50 may have tabs that mate with the notch 32 in the top of the molding cavity 23 when the removable stick 50 is inserted in the molding cavity 23, so as to place a blade 51 thereof substantially near a center of the molding cavity 23. This may facilitate the freezing of a comestible as described further below.

A fill line 33 may be provided to indicate a proper level of fluid to be placed in each molding cavity 23. The fill line 33 may be a step, an indentation or a printed fill line in the molding cavity 23.

A surface finish of the inside of an individual molding cavity 23 is critical to making the release of the frozen comestible by hand possible. When liquids freeze, they have a tendency to stick to surfaces that they are in contact with. Therefore, a coating may be provided on the inner surface 34 of a molding cavity 23 that helps produce a "non-stick" surface thereon. The coating may include a hard anodized aluminum, a special food-grade plastic/epoxy lining (such as used on the interior of aluminum beverage cans), or TEFLON. Any secondary treatment or material that provides a hard, smooth surface finish on the interior of the molding cavity 23, including for example stainless steel, will help ease the manual release of the frozen comestible. Oils, such as a vegetable oil, may instead be used in certain embodiments.

A chamfer 35 may be provided as a beveled or chamfered edge on the molding cavity 23 that acts as a funnel for the fluids that are poured into the molding cavity 23.

Fastener holes 36 are provided for the screws 24 or other fasteners to secure the molding cavities 23 to the bowl 21.

Figure 4:
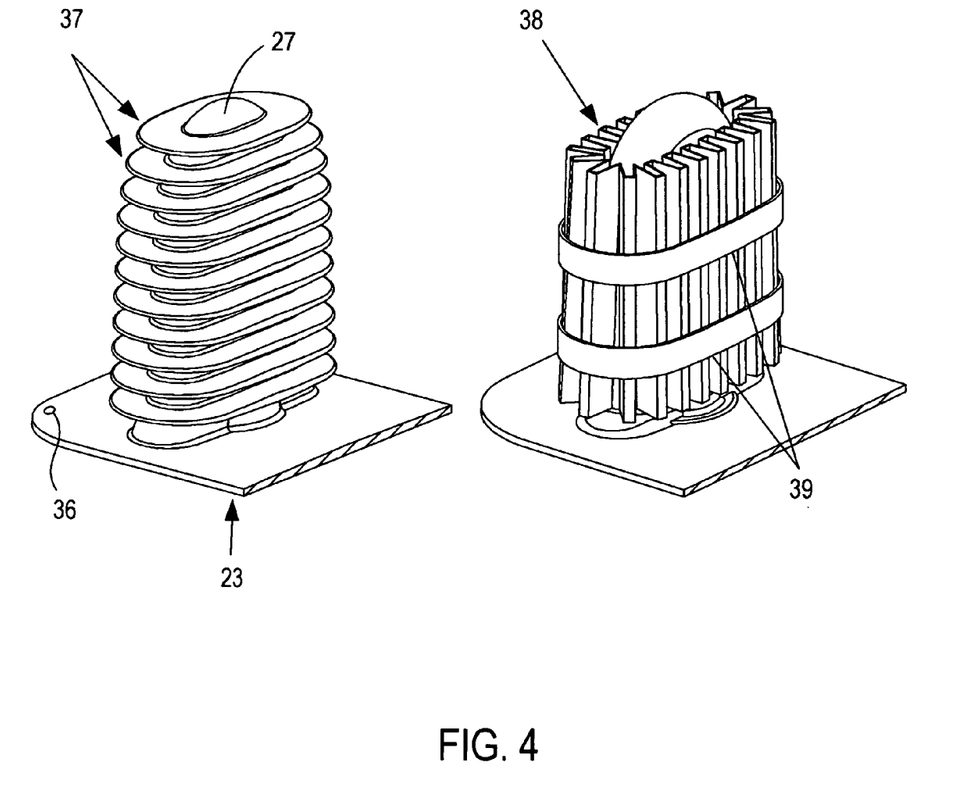
FIG. 4 depicts exemplary heat exchangers for use with the mold cavity of the comestible maker of FIG. 1.

FIG. 4 depicts exemplary heat exchangers 37 for use with the mold cavities 23 of the comestible maker 10. The heat exchangers 37 may be one or more fins made of a highly thermal conductive material, such as aluminum which are disposed within the refrigerant solution in the bowl 21. The heat exchangers 37 are either formed as part of the molding cavity 23 or as a separate part that is attached to the exterior surface 27 of molding cavity 23. For example, it can be a series of fins that are die cast or molded as part of the outside of each molding cavity 23 or attached thereafter. The heat exchangers 27 are made of a material with a high rate of thermal conductivity and its geometry increases the surface area of contact between the mold cavity and the refrigerant solution. This configuration pulls heat away from the liquid that has been poured into the molding cavity 23 at a high rate, causing the contents to freeze rapidly. The geometry of the heat exchangers 37 can be of any geometry that effectively increases the surface area of the molding cavity 23.

A second embodiment of a suitable heat exchanger 38 is also shown in FIG. 4. The heat exchanger 38 may be a piece of corrugated sheet metal that is strapped to the outside of each molding cavity 23 by metallic or plastic straps 39.

Figure 5:
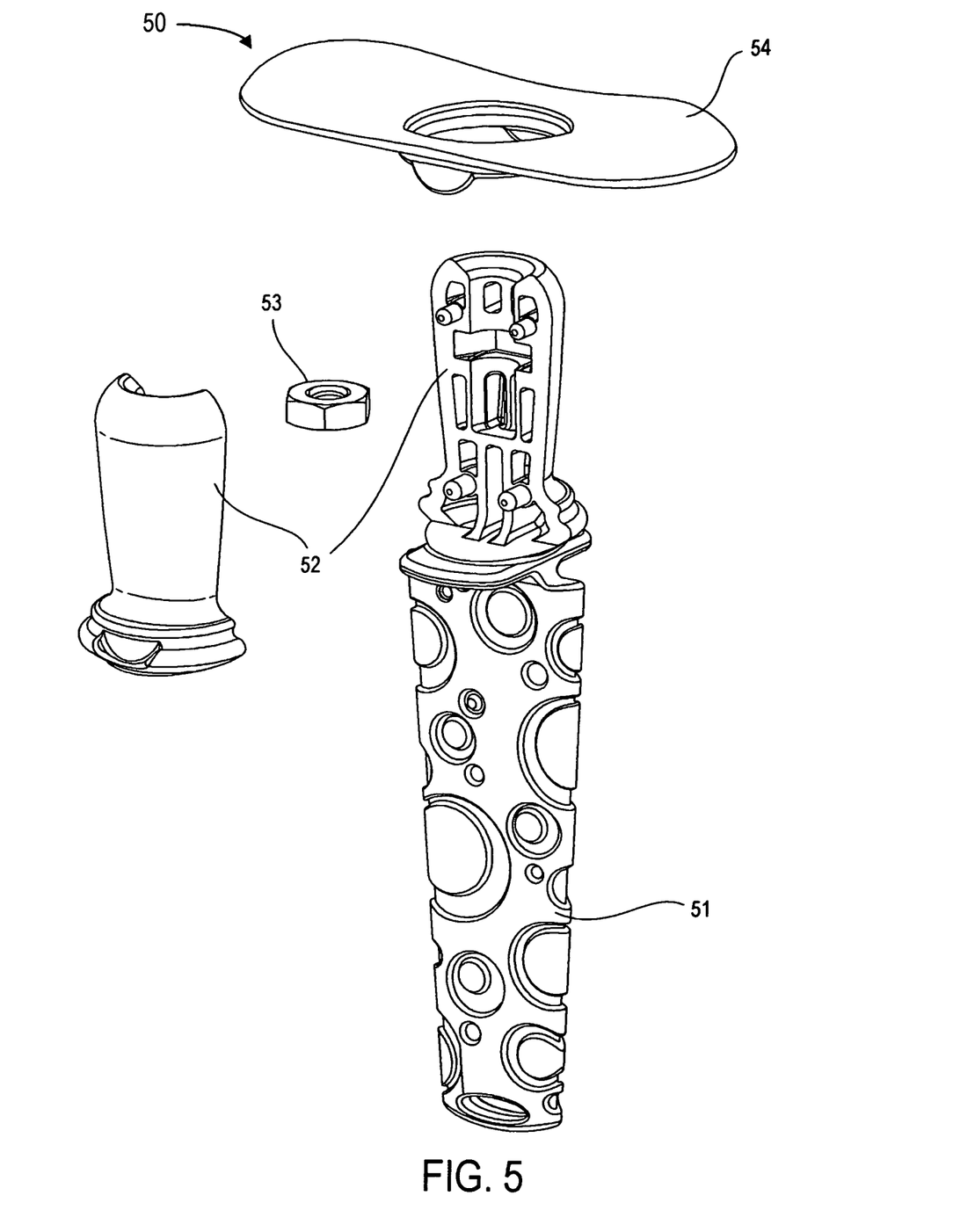
FIG. 5 depicts an exemplary disassembled stick portion for use with the comestible maker of FIG. 1.

FIG. 5 depicts an exemplary disassembled stick 50 for use with the comestible maker 10. The stick 50 has a portion that is submerged in the molding cavity 23 while freezing and a portion that is above the comestible. The portion that is submerged (blade 51) may have holes or undercut channels in it to allow liquid to pass through, and after the liquid freezes, it binds securely to the stick. The length of the submerged portion is, in various embodiments, the same as the depth of the molding cavity 23. This ensures that none of the frozen comestible is left in the molding cavity 23 after extraction. The portion of the stick 50 above the comestible and beyond the top of the molding cavity 23 has a geometry suited to holding the stick 50 centered and in the correct orientation relative to the molding cavity 23, such as by tabs that mate with the notch 32 described above. This portion of the stick 50 may be grasped by a human hand while eating the frozen comestible, and also works with the extraction tool 70. For example, a nut 53 is embedded in the handle 52 to work with a screw of the extraction tool, or a hole is put through the handle 52 to work with a lever, in order to make removal of a frozen comestible by hand easier.

The blade 51 may be sufficiently wide and thick so as to help reduce freeze time by reducing the size of the frozen comestible "core" and filling a substantial part of the center of the molding cavity 23 where comestibles would take longer to freeze. The blade 51 may have grooves or holes to prevent ice from slipping off. The blade 51 may also have one or more shaped indentations, recesses or extrusions in a surface thereof for inducing a design in the frozen comestible and to provide an undercut to which the comestible may adhere when the stick 50 is removed from the comestible maker 10.

Handle portions 52 together form a handle for the stick 50. The handle portions 52 may be secured together by welding or fastening. In various embodiments, the handle may have an opening or notch for mating with an extraction tool 70. The handle portions 52 may include a nut 53 therein and concealed from external view, which is aligned with such a hole or notch to mate with a bolt of an extraction tool 70, as described later below.

A drip cup 54 is a separate part from the stick 50 and may be disposed on the stick 50 by a user. The drip cup 54 may be made of a soft flexible plastic, a silicone or the like. The drip cup 54 may snap on to the stick 50 between the handle 52 and the blade 51 (as shown in FIG. 6) to catch melting frozen comestible droplets from getting on hands, clothes, floors, and furniture.

It is likewise contemplated that the stick 50 and drip cup 54 can be integrally formed as one part. In such embodiments, the drip cup 54 may be translucent or transparent to allow the user to see the status of the freezing process when the stick 50 is placed in the molding cavity 23, reducing the chances of the stick 50 being put left in the molding cavity 23 after too much time has passed and the frozen comestible is too frozen.

Figure 6:
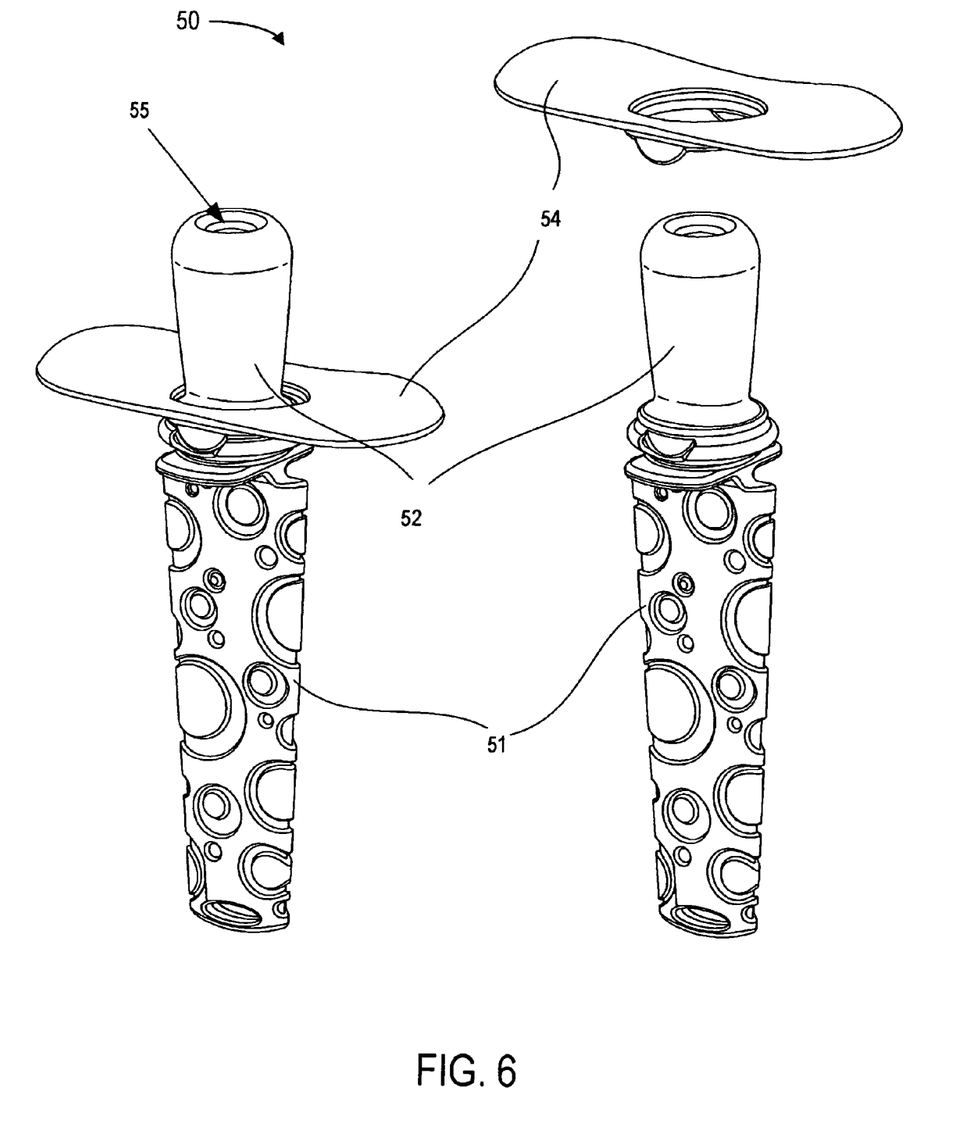
FIG. 6 depicts exemplary assembled and partially assembled stick portions for use with the comestible maker of FIG. 1.

FIG. 6 depicts exemplary assembled and partially assembled stick 50 for use with the comestible maker 10. The handle portions 52 may have an opening 55 for mating with an extraction tool 70 or the like. To help the user overcome the high-level adhesion forces of the frozen comestible against the inner surface 34 of the molding cavity 23, the stick 50 used to remove the frozen "pop" from the molding cavity 23 may include an internal mechanism (such as a screw) that provides a mechanical advantage allowing the user to turn the handle 52 and remove the pop.

Figure 7:
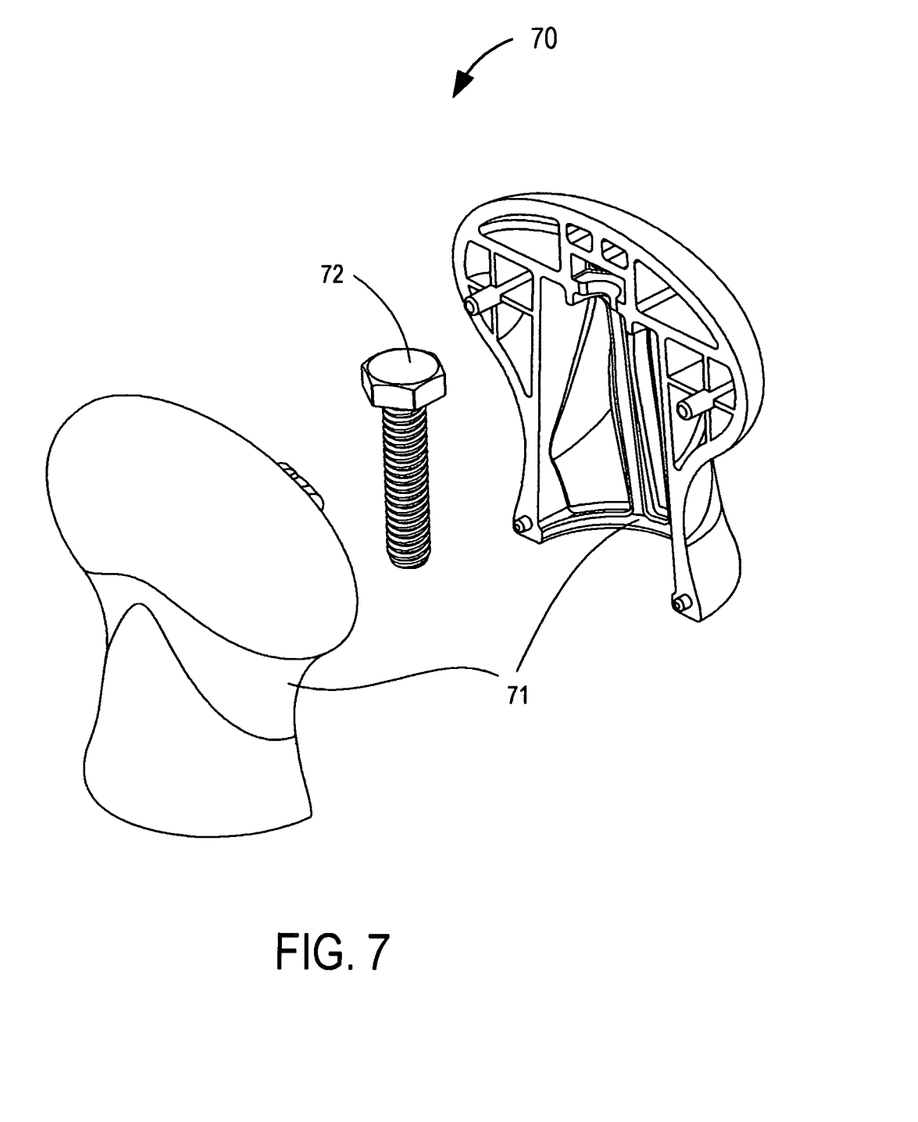
FIG. 7 depicts an exemplary extraction tool for use with the comestible maker of FIG. 1.

FIG. 7 depicts an exemplary extraction tool 70 for use with the comestible maker 10. The extraction tool 70 may be formed by welding or fastening each of the tool portions 71 together. The extraction tool 70 uses the principle of mechanical advantage to convert a relatively low torque force user input into an extremely high linear pulling force on the handle 52 for easier extraction of the frozen comestible by hand. The extraction tool 70 can use a screw, lever, threaded rod or other mechanism, such as a bolt 72, which results in linear upward motion of the stick 50 and mechanical advantage from the user's input when the extraction tool 70 is mated with the handle 52 of the stick 50. The bolt 72 is preferably concealed from view with the tool portions 71. Other designs could incorporate the extraction tool 70 into each stick handle 52 or otherwise negate the need for a separate external extraction tool 70.

Figure 8:
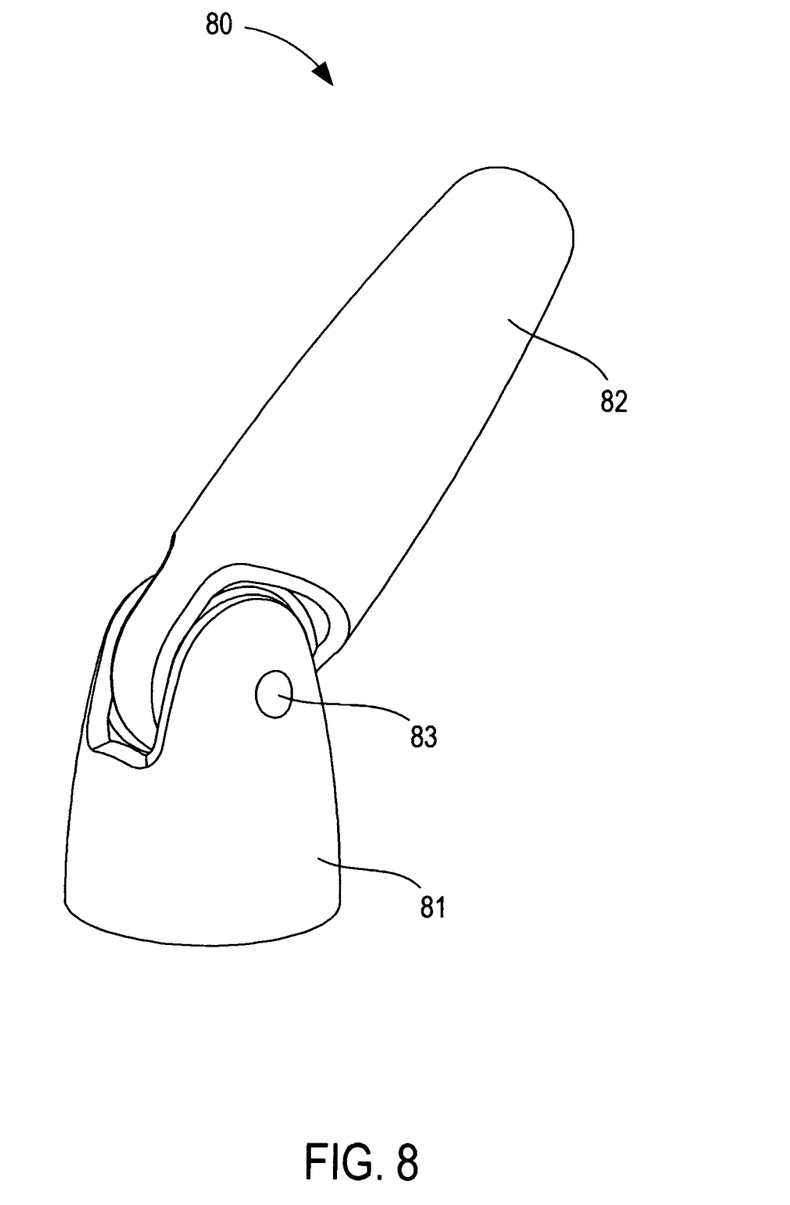
FIG. 8 depicts a second exemplary extraction tool for use with the comestible maker of FIG. 1.

FIG. 8 depicts a second exemplary extraction tool 80 for use with the comestible maker 10, in which the extraction tool 80 includes a lever or cam mechanism to assist in the removal of the device. In particular, the extraction tool 80 may include a portion 81 that mates with the handle 52 of a stick 50, a handle 82 that may be grasped by a human hand and rotated about a cam 83.

Figure 9:
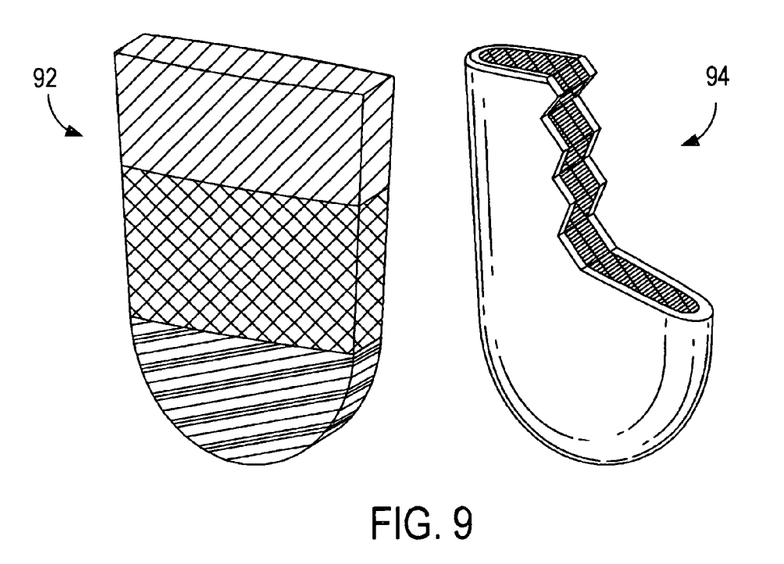
FIGS. 9 and 10 depict exemplary comestibles produced by the comestible maker of FIG. 1.

FIG. 9 depicts exemplary comestibles produced by the comestible maker 10 of FIG. 1. A layered comestible 92 may be formed by adding different layers of a comestible fluid to the molding cavity 23. A coated comestible 94 may be formed by freezing an outer layer of a first fluid, removing the first fluid except for the outer frozen layer from the molding cavity 23 (by suction or pouring out or the like), and adding a second fluid to be frozen within the outer shell.

Figure 10:
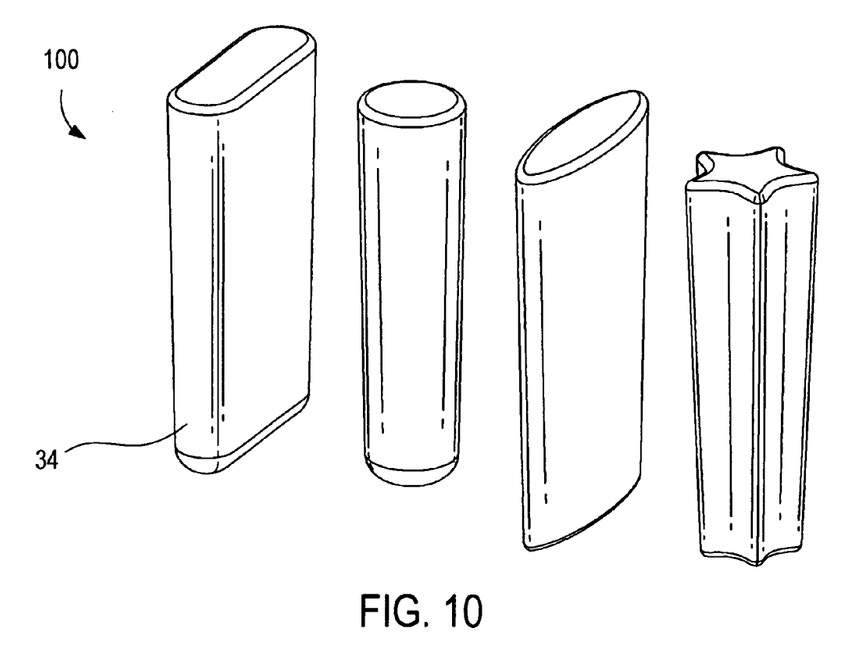

FIG. 10 displays various shaped molds 100 that may be used to produced frozen comestible of various shapes. The shapes are preferably conducive to quick freezing, and may include, without limitation, a racetrack, star, cylinder, ellipse, or any other shape that has a relatively high surface area to volume ratio.

To make frozen comestibles with the comestible maker 10 described above, a user would place the frozen comestible maker 10 in a freezer for 12-24 hours or until the refrigerant solution inside is completely frozen or "charged." Once the refrigerant solution inside the device is frozen, the device is removed from the freezer and placed on to a counter or other level surface. The user then places a stick 50 inside the molding cavity 23 to help facilitate removal of the frozen comestible, and to be used as an implement to hold the frozen comestible while eating. Next, the user can pour water, fruit juice, sugar water, yogurt, or any other pourable comestible into the device. Within ten minutes, the comestible will be frozen solid and the user would use the extraction tool 70 to remove the stick 50 and the frozen comestible from the frozen comestible maker 10. Once a frozen comestible is removed, the molding cavities 23 can be filled with liquid again and the cycle can be repeated several times before the device needs to be recharged. Subsequent fillings may take longer to freeze, but are still very quick when compared to traditional methods. Additionally, the frozen comestible maker 10 will not need as long to recharge after an initial charge and brief use.

The device also allows the user to make multi-flavor frozen comestibles, and frozen comestibles that are layered horizontally, and also frozen comestibles with different flavored cores in a very short period of time, as shown in FIG. 9. Variations can include multi-flavored cores with single flavored outside, or many other variations. The device also allows the user to add other items to the frozen comestibles such as juice, yogurt, coffee, alcoholic drinks, granola, chocolate chips, candy ice cream, etc. The devise allows comestibles to be easily garnished with nuts, candy, fruit etc. and quickly freeze them. Variations of the device could be used for making ice cubes. In practice, the frozen comestible may be a user friendly size for easy consumption, such as approximately 0.75 inches along the width.

Figure 11:
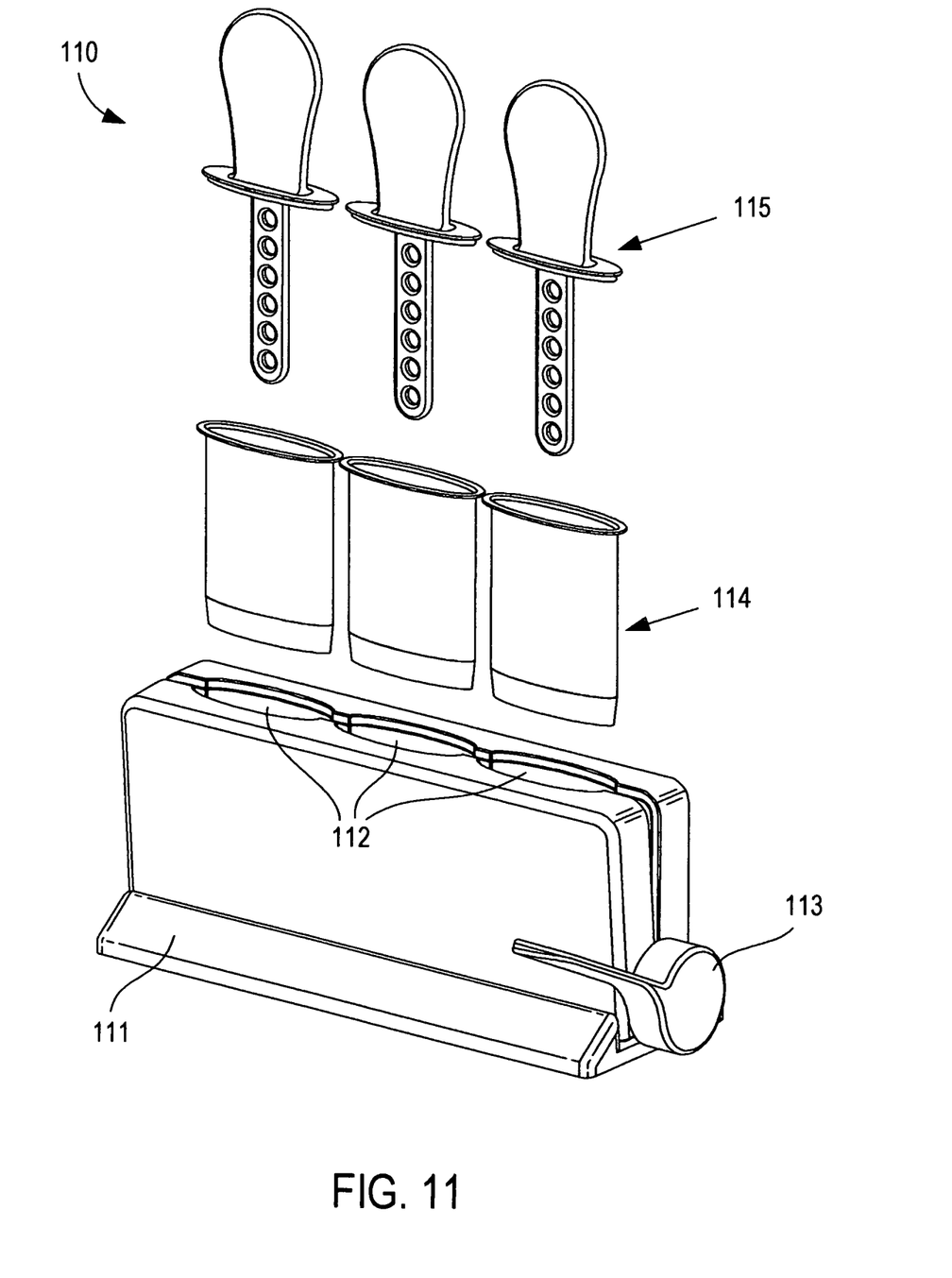
FIG. 11 depicts a second exemplary embodiment of a comestible maker and accessories.

FIG. 11 depicts a second exemplary embodiment of a comestible maker 110 and accessories, such as a base container 111 and molding cavities 112. In this embodiment 110, the molding cavity 112 involves splitting each mold in half and allowing the two halves to open and close like a clamshell. The frozen comestible would be made while the mold cavity halves are closed and then the frozen comestible would be released when the mold halves are opened. For example, the mold cavity 112 could open as two halves thus releasing the frozen comestible or there could be a metal sleeve 114 or other removable fluid container that is inserted into the mold cavity 112 prior to pouring the liquid to be frozen. The removable metal sleeve 114 that drops into the molding cavity 112 prior to pouring liquid that will facilitate heat transfer from the comestible to the freezer solution yet will pull out of the mold cavity easily enough to not need an extraction tool. A user can then easily pull out the sleeve 114 from the molding cavity 112 and hold it under warm running water to release the frozen comestible. A lever 113 may be provided to facilitate removal of the metal sleeve 114 or the sticks 115 from the molding cavities 112 by a user.

Figure 12:
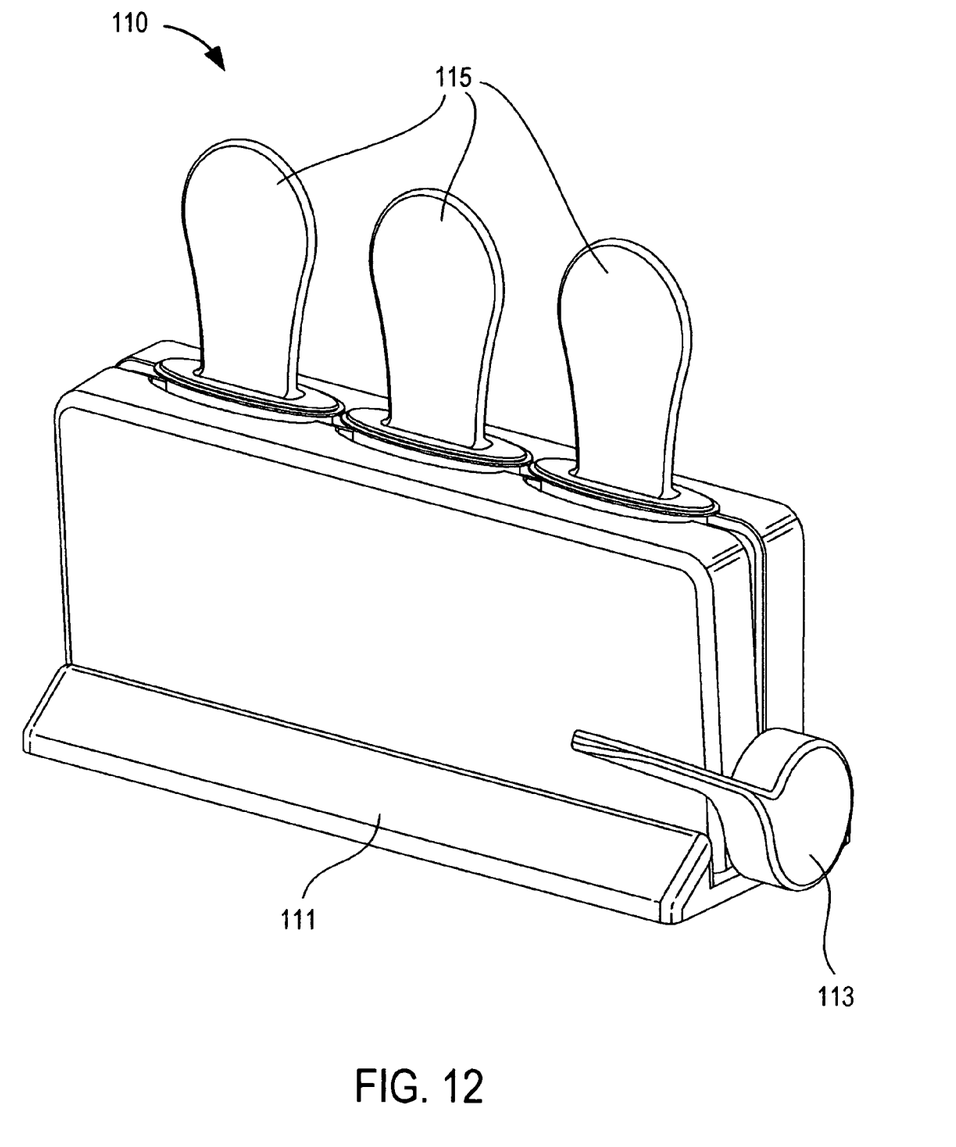
FIG. 12 is a further depiction of the second exemplary embodiment of the comestible maker of FIG. 11.

FIG. 12 is a further depiction of the second exemplary embodiment of the comestible maker 110 of FIG. 11, in which all components are brought together to form a frozen comestible.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. An apparatus for preparing frozen comestibles, comprising:
    a container having an upper end and an interior portion;
    a refrigerant solution provided within said interior portion of said container;
    a mold insert having a base with at least one molding cavity extending therefrom and including an internal portion, said base including at least one opening in communication with said internal portion of said at least one molding cavity, whereby a fluid to be frozen can be introduced into said internal portion of said at least one molding cavity through said at least one opening; and a gasket positioned between said upper end of said container and said base of said mold insert such that said refrigerant solution is self-contained and sealed within said interior portion of said container, said mold insert being attached permanently and non-rotatably proximate to said upper end of said container such that said at least one molding cavity is housed within said interior portion of said container and such that said at least one molding cavity is in contact with said refrigerant solution.

2. The apparatus of claim 1, further comprising a heat exchanger in communication with said at least one molding cavity and in contact with said refrigerant solution.

3. The apparatus of claim 2, wherein said at least one molding cavity includes an exterior surface, said heat exchanger being in communication with said exterior surface of said at least one molding cavity.

4. The apparatus of claim 3, wherein said heat exchanger includes a plurality of fins extending from said exterior surface of said at least one molding cavity.

5. The apparatus of claim 4, wherein said plurality of fins are formed integrally with said at least one molding cavity.

6. The apparatus of claim 3, wherein said heat exchanger includes corrugated sheet metal attached to said exterior surface of said at least one molding cavity.

7. The apparatus of claim 1, wherein said at least one molding cavity includes a plurality of molding cavities and said at least one opening includes a plurality of openings, each of said plurality of openings being in communication with said internal portion of a corresponding one of said plurality of molding cavities.

8. The apparatus of claim 1, wherein said base includes an upper surface, and said at least one molding cavity includes an interior surface and a chamfer formed within said interior surface and proximate to said upper surface of said base for facilitating the pouring of the fluid into said at least one molding cavity.

9. The apparatus of claim 8, wherein said at least one molding cavity includes a fill line for the fluid.

10. The apparatus of claim 1, wherein said at least one molding cavity includes a coating to facilitate the removal of the frozen comestible.

11. The apparatus of claim 10, wherein said coating is selected from the group consisting of an anodized aluminum, a TEFLON substance, stainless steel, and an epoxy lining.

12. The apparatus of claim 1, wherein said at least one molding cavity includes a cross-section having a shape selected from the group consisting of oval, elliptical, racetrack, circular, diamond, wavy, and star.

13. The apparatus of claim 1, further comprising a bezel attached to and surrounding said upper end of said container.

14. The apparatus of claim 1, wherein said container is made from plastic and said mold insert is made from a thermally conductive material selected from the group consisting of aluminum, stainless steel, and conductive plastic.

15. The apparatus of claim 1, further comprising at least one stick that is adapted to be removably inserted within said at least one molding cavity, wherein said at least one stick is adapted to be embedded within the frozen comestible for handling thereof.

16. The apparatus of claim 15, wherein said at least one stick includes a handle to facilitate grasping thereof.

17. The apparatus of claim 16, wherein said at least one stick includes a blade extending from said handle, wherein when said at least one stick is inserted into said at least one molding cavity, said blade extends proximate to a bottom of said at least one molding cavity.

18. The apparatus of claim 17, wherein said blade of said at least one stick includes a width and a thickness that fills a substantial part of the center of said at least one molding cavity.

19. The apparatus of claim 17, wherein said blade of said at least one stick includes at least one selected from the group consisting of shaped holes, recesses, indentations, extrusions, and grooves.

20. The apparatus of claim 16, further comprising an extraction tool adapted to mate with said handle of said at least one stick for extracting the frozen comestible from said at least one molding cavity.

21. The apparatus of claim 20, wherein said extraction tool is mated rotatably with said handle of said at least one stick for producing a torque thereon, such that said extraction tool, when rotated, engages an upper surface of said base of said mold insert in order to provide a linear force on said at least one stick for facilitating the extraction of the frozen comestible from said at least one molding cavity.

22. The apparatus of claim 21, wherein said extraction tool includes a threaded portion having external threads, and said handle of said at least one stick includes a threaded portion having internal threads, said external threads of said threaded portion of said extraction tool threadedly engages said internal threads of said threaded portion of said at least one stick when said extraction tool is mated with said handle of said at least one stick.

23. The apparatus of claim 22, wherein said threaded portion of said extraction tool includes a bolt, and said threaded portion of said at least one stick includes a nut.

24. The apparatus of claim 20, wherein said extraction tool includes a mating portion that mates with the handle of said at least one stick, a cam mechanism, and a handle attached rotatably to said mating portion by said cam mechanism.

25. The apparatus of claim 20, wherein said extraction tool includes a lever, and said handle of said at least one stick includes a hole that is sized and shaped to receive said lever.

26. The apparatus of claim 20, wherein said extraction tool is incorporated into said handle of said at least one stick.

27. The apparatus of claim 17, wherein said mold insert includes at least one notch formed within an upper surface of said base and proximate to said at least one opening, and said at least one stick includes at least one tab that mates with said at least one notch when said at least one stick is inserted within said at least one molding cavity so as to position said blade of said at least one stick substantially near the center of said at least one molding cavity.

28. The apparatus of claim 27, wherein said at least one notch of said mold insert includes a plurality of notches, and said at least one tab of said at least one stick includes a plurality of tabs, each of which mates with a corresponding one of said plurality of notches.

29. The apparatus of claim 17, further comprising a drip cup positioned between said handle and said blade of said at least one stick.

30. The apparatus of claim 29, wherein said drip cup is attached removably to said at least one stick.

31. The apparatus of claim 30, wherein said handle of said at least one stick includes at least one notch, and said drip cup includes at least one tab that releasably engages said at least one notch of said at least one stick.

32. The apparatus of claim 29, wherein said drip cup is formed integrally with said at least one stick.

33. The apparatus of claim 29, wherein said drip cup is made from a material selected from the group consisting of a translucent material and a transparent material.

34. The apparatus of claim 1, wherein said refrigerant solution is selected from the group consisting of a liquid substance or a gel substance.

35. In combination, an apparatus for preparing frozen comestibles, comprising:
  a container having an upper end, a lower end opposite said upper end, and an interior portion formed between said upper and lower ends;
  a refrigerant solution provided within said interior portion of said container, said refrigerant solution being self-contained and sealed within said container;
  a mold insert having a base with an upper surface and a lower surface opposite said upper surface, at least one molding cavity extending from said lower surface of said base and including an exterior surface and an interior surface which defines an internal portion, said base including at least one opening formed within said upper surface thereof and in communication with said internal portion of said at least one molding cavity, whereby a fluid to be frozen can be introduced into said internal portion of said at least one molding cavity through said at least one opening;
  a heat exchanger in communication with said exterior surface of said at least one molding cavity, said mold insert being attached permanently and non-rotatably to said upper end of said container such that said at least one molding cavity is housed within said interior portion of said container and such that said exterior surface of said at least one molding cavity and said heat exchanger are in contact with said refrigerant solution, wherein said at least one molding cavity includes a geometry configured to facilitate centering and balancing of at least one stick therein, such that said at least one stick is adapted to be embedded within the frozen comestible for handling thereof;
  and an extraction tool adapted to mate with said at least one stick for extracting the frozen comestible from said at least one molding cavity.

36. The combination of claim 35, further comprising a drip cup adapted to be attached to said at least one stick.

37. In combination, an apparatus for preparing frozen comestibles, comprising:
  a container having an upper end, a lower end opposite said upper end, and an interior portion formed between said upper and lower ends;
  a refrigerant solution provided within said interior portion of said container, said refrigerant solution being self-contained and sealed within said container;
  a mold insert having a base with an upper surface and a lower surface opposite said upper surface, a plurality of molding cavities, each of which extends from said lower surface of said base and including an exterior surface and an interior surface which defines an internal portion, said base including a plurality of openings, each of which is formed within said upper surface of said base and in communication with said internal portion of a corresponding one of said plurality of molding cavities, whereby a fluid to be frozen can be introduced into each of said internal portions of said plurality of molding cavities through corresponding said plurality of openings;
  a plurality of heat exchangers, each of which is in communication with said exterior surface of a corresponding one of said plurality of molding cavities, said mold insert being attached permanently and non-rotatably to said upper end of said container such that said plurality of molding cavities is housed within said interior portion of said container and such that said exterior surfaces of said plurality of molding cavities and said heat exchangers are in contact with said refrigerant solution,
  wherein each of said plurality of molding cavities includes a geometry configured to facilitate centering and balancing of a corresponding one of a plurality of sticks therein, such that each of said plurality of sticks is adapted to be embedded within the frozen comestible for handling thereof; and
  an extraction tool adapted to mate with each of said plurality of sticks for extracting the frozen comestibles from said plurality of molding cavities.

38. The combination of claim 24, further comprising a plurality of drip cups, each of which is adapted to be attached to a corresponding one of said plurality of sticks.

* * * * *